Figure 1:
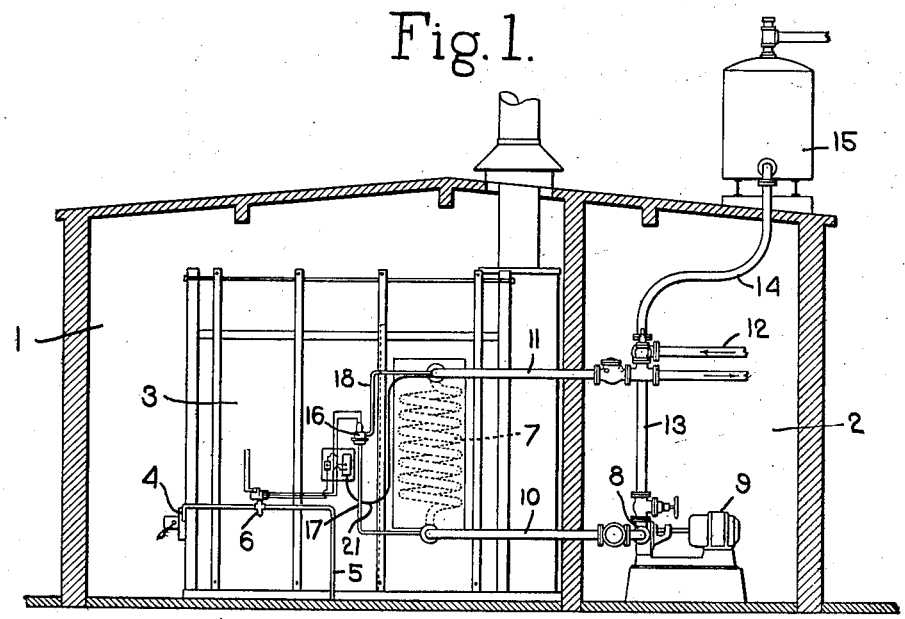

Jan. 9, 1934.  J. W. F. MACDONALD  1,942,436
PROTECTIVE DEVICE FOR COMMERCIAL OIL HEATING SYSTEMS
Filed Jan. 19, 1933

Inventor.
John W. F. Macdonald
by Heard Smith & Tennant.
Attys.

Patented Jan. 9, 1934

1,942,436

UNITED STATES PATENT OFFICE 1,942,436

PROTECTIVE DEVICE FOR COMMERCIAL OIL HEATING SYSTEMS

John W. F. Macdonald, Brighton, Mass., assignor to Parks-Cramer Company, Boston, Mass., a corporation of Massachusetts Application January 19, 1933. Serial No. 652,489

11 Claims. (Cl. 122—504)

This invention relates to improved protective mechanism for high temperature industrial heating systems of the class in which the transmission of heat is accomplished by circulating a fluid heat-transporting medium, such as a mineral oil having a high boiling point, in a closed conduit, with means for heating said medium, and heat-exchanging means located remotely from said heating means by means of which the heat transported by the circulating medium is utilized.

In apparatus of this type, it is important to prevent over-heating of the fluid medium to such a temperature as would result in its carbonization or decomposition. Such over-heating may be due to excessive application of heat to the heating surfaces, or may be caused by the velocity of flow being too low over the surfaces in which the medium is heated.

Circulation of the fluid heat-transporting medium is ordinarily accomplished by means of a pump of sufficient capacity to give a desired rate of flow which will permit the heat-transporting medium to absorb heat from the heating means with sufficient rapidity to avoid such over-heating.

In operation, it is necessary to build up sufficient pressure at the inlet of the heater to maintain circulation of the fluid heat-transporting medium through it at the desired rate of flow. It is important, therefore, that means be provided for discontinuing the operation of the heating means, preferably by cutting off the supply of fuel to the heater in response to excessive temperature of said circulating medium, or in response to deficient circulation and consequent deficient pressure in said circulating medium. The latter precaution is necessary since faulty operation of the pump, or other circulating means, or any accidental or unusual obstruction to circulation might so diminish the rate of flow below its normal value as to expose the circulating medium to danger of over-heating.

The principal object of the invention is to provide an improved protective system for heat-transmitting systems of this type comprising means for controlling the operation of the heating means which will permit or cause the operation of the heating means only when a predetermined minimum differential pressure is maintained in the circulating medium in consequence of the circulation thereof and only when the temperature of said circulating medium is not in excess of a predetermined temperature.

More specifically one of the objects of the invention is to provide means for controlling the heating means comprising pressure-sensitive means responsive only to pressure generated in said circulating medium in consequence of the circulation thereof, and thermo-sensitive means subject to the temperature of said circulating medium, in combination operable in response to deficient circulation, or in response to excessive temperature of said circulating medium to discontinue the operation of said heating means.

Preferably the invention comprises an improved protective system having a single valve, or other suitable means for controlling the supply of fuel to the heating means operatively connected with the pressure-sensitive means, and thermo-sensitive means responsive respectively to the pressure due to and corresponding to the rate of circulation of the fluid heat-transporting medium and to the temperature thereof, in combination operable to discontinue and prevent the supply of fuel during the prevalence either of deficient circulation or of excess temperature in said fluid medium.

Another object of the invention is to provide electrically actuated means for controlling the supply of fuel, and means sensitive to pressure, due to the circulation of the fluid medium, in combination operable to discontinue and prevent the supply of fuel in response to deficient circulation of said medium.

The present invention secures the advantage of harnessing together the various actuating and operating devices in a comprehensive protective system that controls the supply of fuel through a single valve or other suitable controlling means, and that is conveniently adaptable to the use of electric actuation, thus facilitating the selection and use of reliable devices of standard construction in a simple, reliable and relatively inexpensive organization.

The preferred embodiment of the invention herein disclosed comprises means for circulating a fluid heat transporting medium, means for supplying liquid or gaseous fuel to heat said medium, a source of electric energy, an electromotivated valve operable only when energized to supply fuel and otherwise to prevent the supply of fuel, pressure-sensitive means responsive only to the pressure generated in said circulating medium in consequence of the circulation thereof, thermo-sensitive means responsive to the temperature of said fluid medium, and manually operable means in combination operable to effect energization of said electromotivated valve and thereby to establish said supply of fuel only when said pressure exceeds a predetermined minimum, and when the temperature of said fluid medium is below a predetermined limit, and otherwise to prevent said energization and thereby to prevent the supply of fuel.

Figure 2:
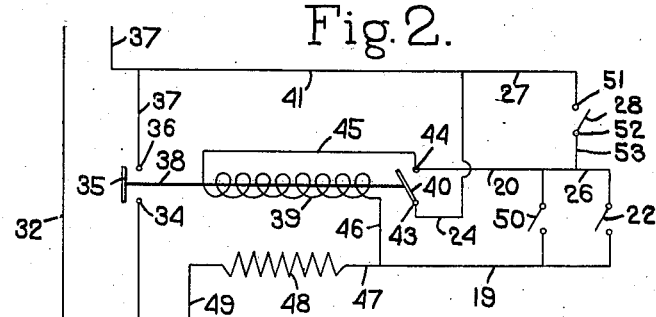
Figure 3:
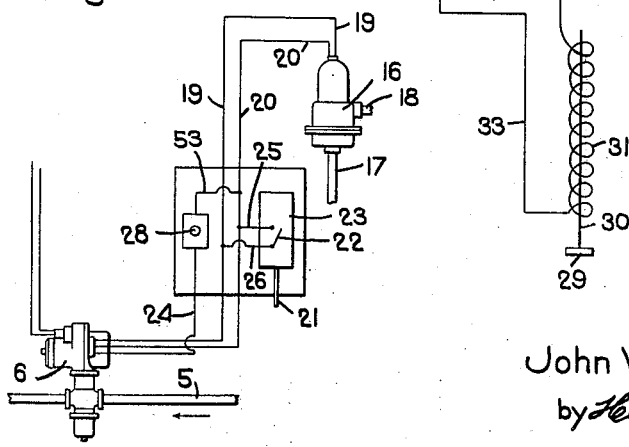

An illustrative embodiment of the invention is shown in the accompanying drawing, in which, Fig. 1 illustrates in vertical section an absorber or furnace room having therein a furnace setting of an oil heating apparatus typical of the class described, and illustrating diagrammatically the relative location and arrangement of its usual accessories and of the principal elements of the invention;

Fig. 2 is a diagrammatic illustration of the electric circuits for controlling the electrically motivated control valve of the fuel supply line; and, Fig. 3 is an enlarged detail view, mainly in diagrammatic form, showing the electrically controlled valve for the fuel supply line and the circuits leading to the pressure-actuated and thermostatically-actuated controlling devices therefor.

The construction illustrated in Fig. 1 of the drawing comprises an absorber room 1, which desirably is divided by a vertical partition to provide a compartment 2 to contain the pump and the controlling valves of the circulating system. The heater 3 may be of any suitable form to provide for the controllable combustion of the fuel. As illustrated, heat is produced in the furnace by a liquid or gaseous fuel burner 4 which is supplied with fuel through a pipe 5 from a suitable source (not shown), the supply of fuel being regulated by an electromotivated valve 6, the operation of which is controlled in a manner hereinafter more fully described. The heat and products of combustion pass upwardly through the furnace, thence downwardly around and through a heating coil 7 through which a fluid heat-transporting medium is continuously circulated.

The circulating heat-transporting medium desirably is a liquid having a high flash point and is maintained at a temperature below its boiling point so as to avoid the generation of gaseous vapors. Circulation of the liquid is produced by a suitable pump 8 preferably actuated by an electric motor 9 which forces the circulating medium through a conduit 10 to the lower end of the coil 7, thereby causing it to flow through a conduit 11 to the heat-exchanging and utilizing means from which it is returned through a conduit 12 and branch conduit 13 to the suction end of the pump, thereby maintaining a continuous forced mechanical circulation, a differential in pressure being maintained by the pump between the inlet and outlet ends of the heating coil 7.

In order to compensate for fluctuations in the volume of the liquid, due to variations in temperature, a pipe 14 extends upwardly from the return conduit 12, preferably in proximity to the pump, and communicates at its upper end with an expansion tank 15 located at a higher level than the pipe or conduit 11.

The circulating system for the heat-transporting medium may be and desirably is similar to that disclosed in Patent No. 1,437,187, granted to John W. F. Macdonald, November 28, 1922. The present invention relates to protective mechanism for controlling the supply of heat to a heat-transmitting system of this type, whereby the operation of the heating means will be discontinued in response to deficient circulation, or in response to excessive temperature of the heat-transporting medium. In the illustrative embodiment of the invention disclosed herein this is accomplished by providing an electromotivated valve for the fuel supply line which is operable only when energized to supply fuel to the burner and by the provision of pressure-sensitive means responsive only to the differential pressure of the liquid in the supply and return conduits of the heating system generated in the circulating medium in consequence of the circulation thereof, and operable only when subject to said differential pressure of said circulating medium in excess of a predetermined minimum to cause the energization of said electromotivated valve, thereby to supply fuel to the burner, and operable upon decrease of said differential pressure below said minimum to de-energize the electromotivated valve and thereby to shut off the supply of fuel to the burner.

The invention also comprises the provision of thermo-sensitive means subject to the temperature of the circulating medium operable when the temperature thereof at any time exceeds a predetermined temperature to de-energize the electromotivated valve and thereby to shut off the supply of fuel to the burner. The valve 6 in the fuel supply line 5 preferably is in the form of a solenoid-actuated valve controlled by a relay and operable to open in response to electrical energization and otherwise to be closed. Such valves and various equivalents thereof are of standard design and are available in self-contained assemblies familiar to the art and need not be described.

Means for supplying current to the solenoid valve and its relay is controlled by a manually operable switch in the relay circuit or a branch thereof. The pressure-operated switch may be of usual construction and may be generally described as comprising a cylinder 16 having a piston reciprocable therein with a pipe 17 communicating with the conduit 10 which leads to the inlet end of the coil 7, and a pipe 18 leading from the upper chamber of the cylinder above the piston to the supply conduit 11 through which the fluid under pressure is conducted from the upper end of the heating coil 7 to the heat-utilizing means. The piston stem desirably extends upwardly and is provided with a suitable jack to engage terminals in the relay circuit comprising conductors 19 and 20 of the circuit of the relay which controls the electrically operated valve 6 in the fuel supply line. The relay circuit comprises a thermostatically operated switch operatively connected to the thermo-sensitive element (not shown) which is preferably located in the supply conduit 11 for the circulating medium near the outlet of the absorber coil of the heater where it is exposed to the temperature of the circulating medium, the arrangement being such that the switch while normally open is caused to close when the temperature of the circulating medium rises above a predetermined and preferably adjustable limit. Since switches of this type are available in many different forms and well known in the art, they need not be herein illustrated in detail. It may, however, be stated that a thermostatic element comprising an expansible fluid is connected by a tube 21 to mechanism for operating a switch 22 which may desirably be located within a casing 23 mounted upon a panel at any convenient location. The switch 22 serves to make and break a branch of the relay circuit comprising conductors 25 and 26 connected respectively to the conductors 19 and 20 forming part of the relay circuit.

Desirably the relay circuit is provided with a branch circuit containing a manually operable push button switch 28 adapted temporarily to complete the circuit through the relay solenoid.

The main and relay circuits for controlling the action of the solenoid-actuated or electromotivated valve in the fuel supply line are diagrammatically illustrated in Fig. 2 in which the solenoid valve 29 is shown as connected to the core 30 of a solenoid coil 31, one end of which is connected to a conductor 32 through which an electric current is supplied from any suitable source of power. The other end of the solenoid coil 31 is connected to a conductor 33 which leads to a terminal 34 of a relay operated switch 35 adapted when closed to complete the main circuit through a companion terminal 36 of the return line 37 leading to said source of power. The switch member 35 of the relay is connected to a core 38 which extends through a relay coil 39 and is connected at its opposite end to a switch 40 in the relay circuit.

The relay circuit comprises a conductor 41 leading from the main conductor 37 and a branch 24 leading from the conductor 41 to a terminal 43 to which the switch 40 is pivotally connected. The companion terminal 44 of the switch 40 is connected by a conductor 45 to one end of the coil 39 of the relay solenoid. The other end of the relay solenoid coil is connected by a conductor 46 to a conductor 47 having therein a resistance 48. The opposite end of the resistance 48 is connected by a conductor 49 to the main conductor 32 which leads to the coil 31 of the solenoid which actuates the fuel controlling valve 29.

The relay circuit is provided with a branch circuit comprising the conductor 20 which leads from the terminal 44 of the relay switch 40 to the pressure operated switch 50 and which also leads through the branch 26 to the thermostatically operated switch 22. The return conductor 19 of this branch circuit is connected to the conductor 47 which leads through the conductor 46 to the relay coil 39 and the conductor 45 leads from the relay coil to the terminal 44.

The relay circuit is provided with another branch circuit which comprises the conductor 24 which leads from the other terminal 43 of the switch 40 to the conductor 41 and 27 of the relay circuit, and thence to the terminal 51 of the manually operated push button switch 28. The companion terminal 52 of the push button switch is connected by a conductor 53 with the conductor 26 of the other branch of the relay circuit which includes the pressure operated switch 50 and thermostatically operated switch 22.

The pressure operated switch 50 is a normally closed switch in the absence of differential pressure in the circulating medium. The thermostatically-operated switch 22 is normally in open position and is closed only when the temperature of the circulating medium exceeds a predetermined temperature. The manually operated push button switch 26 is normally in open position.

The operation of the system, beginning with the cold starting of the apparatus is as follows:—
The pump 8 is first started and circulation of the heat-transporting medium gradually increased to normal circulation. Desirably the pump 8 is provided with a by-pass, such as illustrated in the Macdonald patent above mentioned, to avoid undue pressure in the circulating system due to the initial sluggish movement of the heat-transporting medium. When normal circulation of the heat-transporting medium through the absorber coil 7 has been established, the differential of pressure of the circulating medium between the inlet and outlet of the absorber coil 7 of the heater is impressed upon the pressure-operated switch 50, thus opening the switch 50 and maintaining the branch circuit through the conductors 19 and 20 open.

Circulation having thus been established, heat may be transmitted to the heat-transporting medium. In order to start the heater the manually operable switch is now closed temporarily by manually pressing the push button switch 28, thereby temporarily establishing a circuit through the conductor 37 from the source of the electric current, through the conductors 41, the switch 28, conductors 53, 26, and 20, to the terminal 44 of the relay, thence through the conductor 45, and relay solenoid 39, conductors 46 and 47, resistance 48, and conductor 49 to the return line 32 of the main source of current. The current through the circuit thus established energizes the relay coil 39, thereby closing the switches 35 and 40. Upon the closing of the switch 35 in the main power line the current passes from the conductor 37 through the terminal 36, the switch 35, and terminal 34, to the conductor 33 which leads to the main valve-actuating solenoid 31. The current passes through the solenoid 31 and thence through the return line 32 of the main power circuit. The energization of the valve-actuating solenoid 31 opens the valve and permits fuel to be supplied through the pipe 5 to the burner 4, thereby permitting starting of the burner.

The energization of the relay solenoid 39 not only closes the switch 35, but also closes the switch 40 which is connected to the opposite end of the solenoid core 38, thus establishing a circuit from the power line 37 through the conductors 41, 24, terminal 43, switch 40, terminal 44, and conductor 45, through the relay 39, and conductors 46, 47, resistance 48, and conductor 49 with the return line 32 of the main circuit.

This circuit when established short circuits the branch through the terminal 44 and manually operable push button switch 28 so that the manually operated switch 28 is rendered inoperative so long as the burner is in operation.

The other branch circuit through the conductors 19 and 20 to the pressure operated switch and the thermostatically operated switch is also maintained in open position during the normal operation of the heating system.

When, however, either the pressure operated switch 50 or the temperature actuated switch 22 is closed, the current flowing from the line 37 through the line 41 and the switch terminals 43 and 44 of the relay solenoid will be short-circuited, thereby cutting out the circuit through the relay coil. In thus short circuiting the relay coil the current passes from the main line 37 through the conductors 41, 24, terminal 43, switch 40, terminal 44, to the line 20, thence through either the closed switch 50 or closed switch 22, or both, as the case may be, thence through the conductor 19 and 47, resistance 48, conductor 49, to the main line 32. This temporary short-circuiting of the current de-energizes the relay solenoid 39, permitting the usual spring to open the switches 35 and 40, thereby de-energizing the valve-actuating solenoid 31 and permitting the valve 6 in the fuel line to close and discontinue the supply of fuel to the burner. Failure of the main current from any cause whatever will cause de-energization of both the solenoid coils and thereby cause the valve in the fuel supply line to close and cut off the fuel supply.

When either the pressure operated switch 50 or the temperature actuated switch 22 has been caused to close, the supply of fuel cannot again be renewed by manual operation of the push button switch 28 unless and until normal circulating pressure and normal operating temperature have both been restored so that the switches 50 and 22 will have returned to open position.

The manual closing of the push button switch is also required after the pressure operated switch 50 and temperature actuated switch 22 have been placed in open position before the circuit can again be completed through the relay to open the fuel controlling valve 6 in the manner above described.

While the various elements and arrangements of circuits above described and disclosed are preferred for the purpose of my invention, it will be understood that other motor-actuated valves and other suitable equivalents of the various elements of the apparatus and of equivalent arrangements of electric circuits may be employed within the scope of the following claims.

Having thus described the invention, what is claimed as new, and desired to be secured by Letters Patent, is:

1. In a heat-transmitting system having means for circulating a fluid heat-transporting medium and means for heating said medium, means for controlling said heating means comprising pressure-sensitive means responsive only to pressure generated in said circulating medium in consequence of the circulation thereof, and thermo-sensitive means subject to the temperature of said circulating medium in combination operable in response to deficient circulation and consequent deficient pressure in said circulating medium or in response to excessive temperature of said medium to discontinue the operation of said heating means.

2. In a heat-transmitting system having means for circulating a fluid heat-transporting medium and means for heating said medium, means for controlling the operation of said heating means comprising pressure-sensitive means responsive only to pressure generated in said circulating medium in consequence of the circulation thereof acting only when the pressure in said circulating medium is maintained at or in excess of a predetermined pressure to permit operation of said heating means, and thermo-sensitive means subject to the temperature of said circulating medium in combination operable in response to deficient circulation and consequent deficient pressure in said circulating medium, or in response to excessive temperature of said medium to discontinue the operation of said heating means.

3. In a heat-transmitting system having means for circulating a fluid heat-transporting medium and means for heating said medium, electrically operable means for controlling said heating means comprising pressure-actuated means responsive only to pressure generated in said circulating medium in consequence of the circulation thereof, and thermo-sensitive means subject to the temperature of said circulating medium in combination operable in response to deficient circulation and consequent deficient pressure, or in response to excessive temperature of said medium to cause said electrically operable controlling means to discontinue the operation of said heating means.

4. In a heat-transmitting system having means for circulating a fluid heat-transporting medium, a liquid or gaseous fuel burner for heating said circulating medium, and means for supplying fuel to said burner provided with a regulating valve, means for controlling said valve comprising pressure-sensitive means responsive only to pressure generated in said circulating medium in consequence of the circulation thereof, and thermo-sensitive means subject to the temperature of said medium in combination operable in response to deficient circulation and consequent deficient pressure, or in response to excessive temperature of said medium to close said valve.

5. In a heat-transmitting system comprising means for circulating a fluid heat-transporting medium, and means for heating said medium, electromotivated means for controlling said heating means operable only when energized to cause the operation of said heating means, pressure-sensitive means responsive only to pressure generated in said circulating medium in consequence of the circulation thereof, and thermo-sensitive means subject to the temperature of said circulating medium in combination operable to de-energize said controlling means in response to deficient circulation and consequent deficient pressure, or in response to excessive temperature of said medium, thereby discontinuing the operation of said heating means.

6. In a heat-transmitting system having means for circulating a fluid heat-transporting medium, a liquid or gaseous fuel burner for heating said circulating medium, and means for supplying fuel to said burner, electromotivated valve in said burner-supplying means operable when energized to supply fuel to said burner, pressure-sensitive means responsive only to pressure generated in said circulating medium in consequence of the circulation thereof, and thermo-sensitive means subject to the temperature of said circulating medium in combination operable to de-energize said electromotivated valve in response to deficient circulation and consequent deficient pressure, or in response to excessive temperature of said medium, and thereby to discontinue the supply of fuel to said heating means.

7. In a heat-transmitting system having means for circulating a fluid heat-transporting medium, and means for heating said medium, pressure-sensitive means responsive only to pressure generated in said circulating medium in consequence of the circulation thereof, electromotivated means operable when energized to cause the operation of said heating means and having an electric circuit provided with a switch operable by said pressure-sensitive means and with a manually operable switch so organized as to permit completion of said circuit by the closing of said manually operable switch only when normal pressure is maintained in said circulating medium.

8. In a heat-transmitting system having means for circulating a fluid heat-transporting medium, and means for heating said medium, pressure-sensitive means responsive only to pressure generated in said circulating medium in consequence of the circulation thereof, and thermo-sensitive means subject to the temperature of said circulating medium, electromotivated means operable when energized to cause the operation of said heating means and having an electric circuit provided with switches operable respectively by said pressure-sensitive means and said thermo-sensitive means, and with a manually operable switch so organized as to permit completion of said circuit by the closing of said manually operable switch only when normal pressure is maintained in said circulating medium and the temperature thereof is not in excess of a predetermined minimum.

9. In a heat-transmitting system comprising heating means, supply and return conduits leading from and to said heating means, means for circulating a fluid heat-transporting medium through said heater and said conduits, means for controlling said heating means, pressure-sensitive means responsive to the differential in pressure of said circulating means in said supply and return conduits, and thermo-sensitive means subject to the temperature of the circulating medium in said supply conduit, in combination operable to cause said controlling means to discontinue operation of said heating means in response to deficient circulation and consequent deficient pressure, or in response to excessive temperature.

10. In a heat-transmitting system comprising means for circulating a fluid heat-transporting medium, and means for heating said medium, electromotivated means operable only when energized to cause the operation of said heating means, means for supplying an electric current to said controlling means including a main circuit, and a relay circuit having a manually operable switch adapted when closed to cause the completion of said main circuit, said relay circuit also having a branch circuit provided with switches controlled respectively by pressure-sensitive means responsive only to pressure generated in said circulating medium in consequence of the circulation thereof, and thermo-sensitive means subject to the temperature of said circulating medium, in combination operable in response to deficient circulation, or in response to excessive temperature of said circulating medium to short circuit said relay circuit, and thereby to cause the breaking of said main circuit and discontinuance of the operation of said heating means.

11. In a heat-transmitting system having a heater, supply and return conduits leading from and to said heater, means for circulating a fluid heat-transporting medium through said heater and said conduits, a liquid or gaseous fuel burner for heating said circulating medium, means for supplying fuel to said burner, an electromotivated valve controlling said fuel supply operable only when energized to supply fuel to said burner, means for supplying an electric current to said electromotivated valve comprising a main circuit and a relay circuit provided with a manually operable switch adapted when temporarily closed to complete said relay circuit, means operable upon the completion of said relay circuit to complete said main circuit, a branch circuit from said relay circuit having a normally closed pressure-operated switch and a normally open thermostatically-operated switch, pressure-sensitive means responsive only to pressure generated in said circulating medium in consequence thereof operable only upon maintenance of a predetermined pressure in said circulating medium to maintain said pressure-operated switch in open position, and thermo-sensitive means subject to the temperature of the circulating medium in said supply conduit operable only in response to excessive temperature to close said temperature-operated switch, whereby upon the closing of said pressure-operated switch in consequence of deficient circulation, or the closing of said temperature-operated switch in response to excessive temperature, the relay circuit will be short circuited, thereby breaking the main circuit and causing said electromotivated switch to discontinue the supply of fuel to said burner.

JOHN W. F. MACDONALD.